(12) United States Patent
Arzani et al.

(10) Patent No.: US 12,063,142 B2
(45) Date of Patent: *Aug. 13, 2024

(54) IMPACT-AWARE MITIGATION FOR COMPUTER NETWORKS

(71) Applicant: Microsoft Technology Licensing, LLC, Redmond, WA (US)

(72) Inventors: Behnaz Arzani, Redmond, WA (US); Pooria Namyar, Los Angeles, CA (US); Daniel Stopol Crankshaw, Seattle, WA (US); Daniel Sebastian Berger, Seattle, WA (US); Tsu-wang Hsieh, Sammamish, WA (US); Srikanth Kandula, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/182,348

(22) Filed: Mar. 12, 2023

(65) Prior Publication Data

US 2023/0370322 A1    Nov. 16, 2023

Related U.S. Application Data

(63) Continuation of application No. 17/663,641, filed on May 16, 2022, now Pat. No. 11,611,466.

(51) Int. Cl.
*H04L 41/0604* (2022.01)
*H04L 41/0631* (2022.01)
(Continued)

(52) U.S. Cl.
CPC ...... *H04L 41/0627* (2013.01); *H04L 41/0631* (2013.01); *H04L 41/12* (2013.01); *H04L 43/0817* (2013.01); *H04L 43/55* (2022.05)

(58) Field of Classification Search
CPC . H04L 41/0627; H04L 41/0631; H04L 41/12; H04L 43/0817; H04L 43/55
See application file for complete search history.

(56) References Cited

U.S. PATENT DOCUMENTS 8,862,535 B1 * 10/2014 Talwadker .............. H04L 67/10
  700/32
10,075,327 B2    9/2018 Maltz et al.
(Continued)

FOREIGN PATENT DOCUMENTS

WO    2013048572 A1    4/2013

OTHER PUBLICATIONS

Leitner, et al., "Cost-Based, Optimization of Service Compositions", In Proceedings of IEEE Transactions on Services Computing, vol. 6, Issue 2, Apr. 2013, pp. 239-251.
(Continued)

*Primary Examiner* — Philip C Lee
(74) *Attorney, Agent, or Firm* — Alleman Hall & Tuttle LLP

(57) ABSTRACT

A computing system identifies mitigation actions in response to failures within a computer network. A service level objective is obtained by the computing system for client-resource data flows traversing the computer network between client-side and resource-side nodes. Indication of a failure event at a network location of the computer network is obtained. For each mitigation action of a set of candidate mitigation actions, an estimated impact to a distribution of the service level objective is determined for the mitigation action by applying simulated client-resource data flows to a network topology model of the computer network in combination with the mitigation action and the failure event. One or more target mitigation actions are identified by the computing system from the set of candidate mitigation (Continued)

actions based on a comparison of the estimated impacts of the set of candidate mitigation actions.

20 Claims, 11 Drawing Sheets

(51) Int. Cl.
*H04L 41/12* (2022.01)
*H04L 43/0817* (2022.01)
*H04L 43/55* (2022.01)

(56) References Cited

U.S. PATENT DOCUMENTS

| | | | | |
|---|---|---|---|---|
| 2007/0112870 | A1* | 5/2007 | Korupolu | G06F 3/067 |
| 2009/0210376 | A1* | 8/2009 | Lorge | G06N 5/04 |
| | | | | 706/47 |
| 2013/0086269 | A1* | 4/2013 | Bairavasundaram | |
| | | | | G06F 11/3495 |
| | | | | 709/226 |
| 2013/0132561 | A1* | 5/2013 | Pasala | H04L 67/1097 |
| | | | | 709/224 |
| 2014/0372347 | A1* | 12/2014 | Cohen | G06N 20/00 |
| | | | | 714/15 |
| 2017/0012848 | A1* | 1/2017 | Zhao | H04L 43/04 |
| 2017/0104651 | A1* | 4/2017 | Kakadia | H04L 43/04 |
| 2021/0334186 | A1 | 10/2021 | Chen et al. | |
| 2023/0110983 | A1* | 4/2023 | He | H04L 41/5025 |
| | | | | 370/217 |

OTHER PUBLICATIONS

"International Search Report and Written Opinion Issued in PCT Application No. PCT/US2023/013381", Mailed Date: Jun. 2, 2023, 13 Pages.

* cited by examiner

| FAILURE TYPE | MITIGATION ACTIONS |
|---|---|
| PACKET DROP ABOVE TOP OF RACK | TAKE DOWN THE SWITCH OR LINK |
| | BRING BACK LESS FAULTY LINKS TO ADD CAPACITY |
| | CHANGE WCMP WEIGHTS |
| | DO NOT APPLY ANY AFFIRMATIVE MITIGATION ACTION |
| PACKET DROP AT TOP OF RACK | DISABLE THE TOP OF RACK |
| | MOVE TRAFFIC (E.G., CHANGE SERVICE PLACEMENT) |
| | DO NOT APPLY ANY AFFIRMATIVE MITIGATION ACTION |
| CONGESTION ABOVE THE TOP OF RACK | DISABLE THE LINK |
| | DISABLE THE DEVICE |
| | BRING BACK LESS FAULTY LINKS TO ADD CAPACITY |
| | CHANGE WCMP WEIGHTS |
| | DO NOT APPLY ANY AFFIRMATIVE MITIGATION ACTION |

FIG. 4

| MITIGATION ACTIONS | COMBINED ESTIMATED IMPACT | LONG FLOW IMPACT (AVE. THROUGHPUT) | SHORT FLOW IMPACT (AVE. THROUGHPUT) | LONG FLOW IMPACT (FTC) | SHORT FLOW IMPACT (FTC) |
|---|---|---|---|---|---|
| MITIGATION ACTION A | COMBINED VALUE 510 | VALUE 512 | VALUE 514 | VALUE 516 | VALUE 518 |
| MITIGATION ACTION C | COMBINED VALUE 520 | VALUE 522 | VALUE 524 | VALUE 526 | VALUE 528 |
| MITIGATION ACTION D | COMBINED VALUE 530 | VALUE 532 | VALUE 534 | VALUE 536 | VALUE 538 |
| MITIGATION ACTION B | COMBINED VALUE 540 | VALUE 542 | VALUE 544 | VALUE 546 | VALUE 548 |

Column weights: WEIGHT W-1, WEIGHT W-2, WEIGHT W-3, WEIGHT W-4

RANK: LESSER IMPACT ← → GREATER IMPACT

FIG. 5

Input: $G$, current network state.
Input: $\mathcal{T} = \{<\text{src, dst, size, start time}>\}$.
Input: $\mathcal{P}$, (sample) Set of paths for all flows.
Input: $\mathcal{I} \subset \mathcal{T}$, measurement interval.
Input: $\zeta$, epoch size.
Output: $\beta_l$, distribution of throughput of long flows 1  $\mathcal{K} \leftarrow \{\}$
2  $time \leftarrow 0$
3  $\beta_l \leftarrow []$
4  while $\exists f \in \mathcal{T} : f.start \geq time - \zeta$ or $\mathcal{K} \neq \emptyset$ do
5      $time \leftarrow time + \zeta$
6      $\mathcal{K}.add(\{f \in \mathcal{T} : time - \zeta \leq f.start < time\})$
7      $\theta_f \leftarrow compute\_throughput(G, \mathcal{K}, \mathcal{P})$
8      for $flow\ f$ in $\mathcal{K}$ do
9          $f.sent \leftarrow min(f.sent + \zeta\theta_f, f.size)$
10         if $f.sent = f.size$ then
11             $\mathcal{K}.remove(f)$
12             if $f \in \mathcal{I}$ then
13                 $\beta_l.append(\frac{f.size}{f.dur})$
14             end
15         end
16     end
17 end
18 return $\beta_l$

FIG. 7

Input: $G$. current network state.
Input: $\mathcal{T}_{1\times n}$. source destination pairs (long flows).
Input: $\mathcal{P}_{1\times n}$. The (sampled) paths for each flow.
Output: $\theta_{1\times n}$. Throughput 1  $it \leftarrow 0_{1\times n}$ /* alloc. from prev it  */
2  $\theta \leftarrow get\_drop\_limited\_tput(G, \theta_i)$
3  $Z \leftarrow \theta$
4  repeat
5  $\quad it \leftarrow \theta$
6  $\quad U \leftarrow Z$
7  $\quad$ for *tier t in G* do
8  $\quad\quad$ for *edge e in t* do
9  $\quad\quad\quad \theta \leftarrow get\_cap\_limited\_tput(\mathcal{T}, \theta, \mathcal{P}, G, e)$
10 $\quad\quad\quad$ for *flow i in* $\mathcal{T}$ do
11 $\quad\quad\quad\quad \theta_i \leftarrow min(U_i, \theta_i)$
12 $\quad\quad\quad\quad U_i \leftarrow \theta_i$
13 $\quad\quad\quad$ end
14 $\quad\quad$ end
15 $\quad$ end
16 until $\max_i(\frac{|it_i - \theta_i|}{\theta_i}) \leq \epsilon$ /* Convergence  */
17
18 return $F$

FIG. 8

Input: $\mathcal{T}$, traffic matrix {<src, dst, start time, size>}.
Input: $G$, current network state (location, type, and magnitude of failures).
Input: $\mathcal{M}$, mitigation.
Input: $\alpha$, confidence threshold
Output: $\beta_l = \{<\beta_l^{S(\mathcal{P})}, S(\mathcal{P}).prob>\}$. For all possible combination of flow paths $S(\mathcal{P})$, $\beta_l^{S(\mathcal{P})}$ is the distribution of impact over all long flows.
Output: $\beta_s = \{<\beta_s^{S(\mathcal{P})}, S(\mathcal{P}).prob>\}$. For all possible combination of flow paths $S(\mathcal{P})$, $\beta_s^{S(\mathcal{P})}$ is the distribution of impact over all short flows.

1  $N \leftarrow num\_samples(\alpha)$
2  $G_a, \mathcal{T}_a \leftarrow apply\_mitigation(G, \mathcal{M}, \mathcal{T})$
3  $\mathcal{T}_s, \mathcal{T}_l \leftarrow split\_traffic(\mathcal{T}_a)$
4  for $n \in 1 \ldots N$ do
5  $\quad \mathcal{P}_n \leftarrow get\_sample(S(\mathcal{P}))$
6  $\quad \beta_l^{\mathcal{P}_n} \leftarrow impact\_long\_flows(G_a, \mathcal{T}_l, \mathcal{P}_n)$
7  $\quad \beta_s^{\mathcal{P}_n} \leftarrow impact\_short\_flows(G_a, \mathcal{T}_s, \mathcal{P}_n)$
8  end
9  return $\beta_l, \beta_s$

FIG. 9

Input: $G$. current network state.
Input: $\mathcal{T}_{1\times M}$. source destination pairs (long flows).
Input: $\mathcal{P}_{1\times M}$. The (sampled) paths for each flow.
Input: $\theta_{1\times M}$. Input rates for all the flows.
Input: $e$. Link
Output: $\hat{\theta}_{1\times M}$. Throughput rates after applying congestion.

1   $C \leftarrow G.get\_link\_cap(e)$
2   $\hat{\theta} \leftarrow [0]_{N\times M}$
    /* Line 3: computes the total load on the link */
3   $L \leftarrow \sum_{j\in 1...M} \theta_j$
    /* Line 4: divides the samples into three categories; under-utilized, fully-utilized, over-utilized samples. */
4   if $L \leq C$ then
      /* Line 5: for under-utilized samples — split the additional capacity among all the flows */
5       $\hat{\theta} \leftarrow \theta + split\_add\_capacity\_equally(\theta, L, C)$
6   end
7   else if $L \geq C$ then

FIG. 10A

```
   /* Line 6: for over-utilized
      samples —   run max-min
      fairness with respect to the
      current rate of each flow    */
 8  θ̂ ← max_min_wrt_demand(θ, L, 𝒯̂ₒ, C)
 9 end
10 return θ̂
```

FIG. 10B ically, cloud-based client, may be located at a client-side node of the network. In the course of accessing a resource hosted by the computer network,
IMPACT-AWARE MITIGATION FOR COMPUTER NETWORKS

CROSS REFERENCE TO RELATED APPLICATIONS

This application is a continuation of U.S. patent application Ser. No. 17/663,641, filed May 16, 2022, the entirety of which is hereby incorporated herein by reference for all purposes.

BACKGROUND

Computer networks including data centers and cloud computing platforms host resources that are accessible to clients over a communications network, such as the Internet. Computer networks may include a collection of tiered, inter-linked nodes that are operable to provide load balancing and routing of data flows between clients and resources hosted by the network. Failure of a node or link within a computer network can negatively impact service-level performance from the perspective of the clients. Network operators are tasked with maintaining a suitable level of performance of their computer networks by taking appropriate mitigation actions in response to failures within the network.

SUMMARY

A computing system identifies mitigation actions that may be implemented by network operators or programmatically implemented by the computing system in response to failure events within a computer network. The computer network includes a set of nodes in which each node is linked by a communication link to one or more other nodes of the set of nodes. A service level objective is obtained by the computing system for client-resource data flows traversing the computer network between client-side and resource-side nodes. Indication of a failure event at a network location of the computer network is obtained. A set of candidate mitigation actions for the failure event are identified. For each mitigation action of the set of candidate mitigation actions, an estimated impact to a distribution of the service level objective is determined for the mitigation action by applying simulated client-resource data flows to a network topology model of the computer network in combination with the mitigation action and the failure event. One or more target mitigation actions are identified by the computing system from the set of candidate mitigation actions based on a comparison of the estimated impacts of the set of candidate mitigation actions. For each target mitigation action, the computing system outputs an identifier of the target mitigation action.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 depicts a table of example failure types and associated mitigation actions.

FIG. 5 depicts an example of a ranked list of a set of candidate mitigation actions.

FIG. 7 depicts an example algorithm for determining an estimated impact for long-duration data flows and an estimated impact for short-duration data flows.

FIG. 8 depicts an example algorithm for determining an estimated impact on long-duration data flows.

FIG. 9 depicts an example algorithm for determining throughput.

FIGS. 10A and 10B depict an example algorithm for capacity limited throughput.

DETAILED DESCRIPTION

Figure 1A:
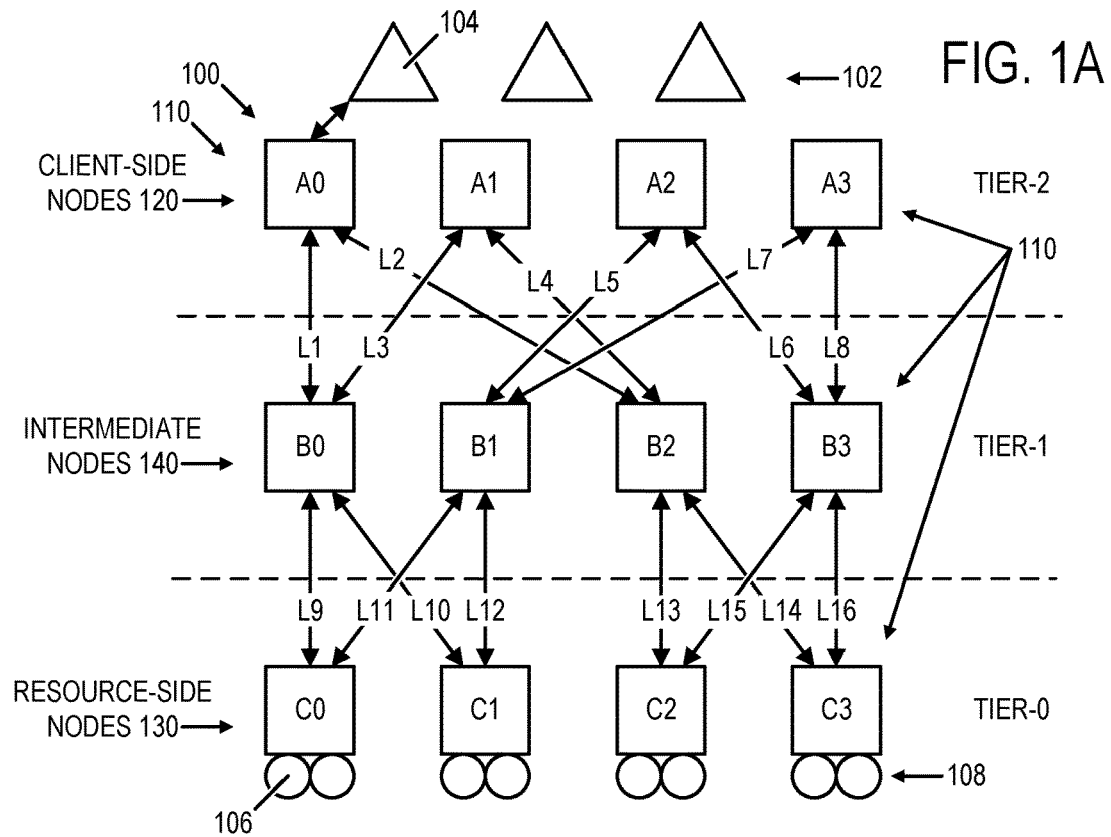
FIG. 1A is a schematic diagram depicting an example computer network.

According to an example of the present disclosure, a failure mitigation service implemented by a computer system identifies candidate mitigation actions for addressing failures occurring within a computer network. The failure mitigation service can provide insight as to potential impact on service level objectives by each candidate mitigation action. By understanding the potential impact of mitigation actions, network operators and network control processes can make informed decisions that promote selection and implementation of appropriate mitigation actions to address network failures, while preserving service level objectives.

A service level objective (SLO), within the context of the present disclosure, refers to a performance metric of client-resource data flows that traverse the computer network between client-side nodes and resource-side nodes of the computer network. Performance metrics of service level objectives are experienced or otherwise perceived by clients in the course of accessing resources of a computer network.

As an example, a service level objective may include a throughput of client-resource data flows that traverse the computer network between client-side nodes and resource-side nodes of the computer network. Throughput, in this example, refers to a quantity of data flowing per unit time on a per data flow basis between the client and a resource destination within the computer network in which each data flow, as a connection, is defined by a 5 tuple (unique source address (e.g., IP address), destination address (e.g., IP address), source port, destination port, and protocol). For purposes of estimating SLO impact in this example, an estimated impact to a distribution (e.g., average, minimum, maximum, quantile, range, percentile, or other statistical metric) of the throughput may be used to compare and rank mitigation actions. As an example, throughput may be used as a service level objective for assessing impact to long-duration data flows, such as data flows for resources of a larger size that persist within a computer network for longer durations of time and may reach steady state under a transport protocol of the computer network.

As another example, a service level objective may include a flow completion time (FCT) of client-resource data flows that traverse the computer network between client-side nodes and resource-side nodes of the computer network. Flow completion time, in this example, refers to a duration of time for a client-resource data flow within of a particular size to be completed by the computer network. For purposes of estimating SLO impact in this example, an estimated impact to a distribution (e.g., average, minimum, maximum, quantile, range, percentile, or other statistical metric) of FCT may be used to compare and rank mitigation actions. As an example, FCT may be used as a service level objective for assessing impact to short-duration data flows, such as data flows for resources of a smaller size that persist within a computer network for shorter durations of time and may not reach steady state under a transport protocol of the computer network.

As yet another example, a service level objective may include packet jitter or packet delay variation (PDV) of client-resource data flows that traverse the computer network between client-side nodes and resource-side nodes of the computer network. Packet jitter or PDV, in this example, refers to a variation in latency of data packets (e.g., variability over time) for the client-resource data flows. For purposes of estimating SLO impact in this example, an estimated impact to a distribution (e.g., average, minimum, maximum, quantile, range, percentile, or other statistical metric) of jitter may be used to compare and rank mitigation actions.

To reduce or minimize impact to service level objectives, the failure mitigation service identifies a set of candidate mitigation actions in response to a failure event detected within the computer network, and evaluates the candidate mitigation actions for impact to a distribution of each of the service level objectives of the computer network. The set of candidate mitigation actions may include affirmative mitigation actions that include disabling a node or link, rerouting data flows, or rolling back a previous mitigation. The candidate mitigation actions may also include a mitigation action that prescribes no affirmative mitigation action be taken in response to the failure event.

In at least some examples, the failure mitigation service identifies candidate mitigation actions for a failure event by referencing a failure-action map that associates a plurality of failure types with corresponding sets of candidate mitigation actions. The failure-action map may be extensible, enabling network operators to modify the failure-action map for particular failure types, for example, by adding, removing, or combining mitigation actions that are to be evaluated by the failure mitigation service.

The failure mitigation service has the potential to provide accurate estimates of impact to service level objectives (e.g., to a distribution to each of the service level objectives) within complex computer networks by simulating client-resource data flows on a topology model of the computer network, and by ranking candidate mitigation actions based on their respective impact to the service level objectives. Existing mitigations, existing failures, and traffic characterizations for the computer network may be applied to the topology model in combination with mitigation actions being evaluated to address a failure event.

In at least some examples, simulated client-resource data flows may be modeled by the failure mitigation service to account for data rate control processes implemented by communications protocols used by the computer network. As an example, transport protocols such as the Transport Control Protocol (TCP) and associated network congestion-avoidance algorithms used within the context of the Internet protocol suite may be considered by the failure mitigation service by separately modeling impact to service level objectives for long-duration data flows and short-duration data flows. This approach recognizes that long-duration data flows typically reach steady state with computer networks under data rate control processes and associated congestion-avoidance algorithms, whereas short-duration data flows typically do not reach steady state before completion of the data flow. Within this context, a service level objective for long-duration data flows may include throughput, whereas a service level objective for short-duration data flows may include a flow completion time, as an example.

The failure mitigation service may rank candidate mitigation actions based on their respective impact to a distribution of each service level objective of a combination of two or more service level objectives based on the simulated client-resource data flows. As an example, an estimated impact to a distribution of throughput for long-duration data flows and an estimated impact to a distribution of flow completion time for short-duration data flows by a particular mitigation action may be combined to obtain an overall impact by that mitigation action. This approach enables the ranking of mitigations by the failure mitigation service to incorporate differences in flow limitations between long-duration data flows that reach steady state and short-duration data flows that do not reach steady state.

Failure events may be incorporated into the topology model by the failure mitigation service as a failure vector that identifies a network location of the failure event within the computer network, a failure type of the failure event, and a magnitude of the failure event, as an example. By considering the magnitude or severity of the failure event, the failure mitigation service is able to rank a variety of mitigation action types, including taking no action in response to the failure event or rolling back existing mitigation actions previously applied to the computer network.

In at least some examples, a ranked list of candidate mitigations or a portion thereof for a given failure event may be output by the failure mitigation service. One or more target mitigations output by the failure mitigation service may correspond to a subset of the candidate mitigation actions having the least impact on one or more service level objectives if implemented within the computer network. Network operators may use the ranked list and/or target mitigations output by the failure mitigation service to select a particular mitigation action to implement within the computer network. Alternatively or additionally, a network control system of the computer network may programmatically implement a target mitigation action output by the failure mitigation service within the computer network without necessarily requiring input by network operators. Network operators may selectively rollback or cancel mitigation actions programmatically implemented by the network control system.

FIG. 1A is a schematic diagram depicting an example computer network 100. Computer network 100 includes a set of nodes 110 (e.g., A0-A3, B0-B3, C0-C3) in which each node of set of nodes is linked by a communication link (e.g., L1-L16) to one or more other nodes of the set of nodes. For example, within computer network 100, node A0 is linked by communication link L1 to node B0, and node B0 is linked to node C0 by communication link L9.

Nodes 110 may take the form of a physical network switch associated with a networking device, such as a server, network appliance, or a group of multiple servers and/or network appliances. In at least some examples, communication links of the computer network may refer to physical, hardware-based (e.g., fiber, copper, etc.) network pathways between nodes. However, in at least some examples, communication links of the computer network may include wireless links or a combination of wireless and physical hardware-based links.

Nodes 110 of computer network 100 may be organized into two or more tiers between clients 102 (of which client 104 is an example) and resource servers 106 (of which resource server 108 is an example). In this example, nodes 110 are organized into three tiers in which nodes A0-A3 form part of Tier-2 (T2), nodes B0-B3 form part of Tier-1 (T1), and nodes C0-C3 form part of Tier-0 (T0). While computer network 100 is depicted having three tiers, it will be understood that nodes of a computer network may be organized into fewer or greater quantities of tiers.

In the example of FIG. 1A, nodes C0-C3 of T0 form resource-side nodes 130 with respect to resources accessible at or by resource servers 106, nodes A0-A3 of T2 form client-side nodes 120 by which computer network 100 is accessed by clients 102, and nodes B0-B3 of T1 form intermediate nodes 140 between nodes C0-C3 of T0 and nodes A0-A3 of T2. Client-resource data flows between clients 102 and resources accessible at or by resource servers 106 traverse computer network 100 between client-side nodes 120 and resource-side nodes 130.

Nodes of a computer network may be linked to one or more nodes of a neighboring tier. For example, within computer network 100, node A0 of T2 is linked to node B0 of T1 by communication link L1 and to node B2 of T1 by communication link L2. As another example, node B0 of T1 is linked to node C0 of T0 by communication link L9 and to node C1 of T0 by communication link L10. In this example, client-resource data flows between client 104 and resources accessible at or by resource server 106 may traverse computer network 100 between node A0 of client-side nodes 120 and node C0 of resource-side nodes 130 via communication link L1, node B0 of intermediate nodes 140, and link L9.

It will be understood that computer network 100 of FIG. 1 is merely one example a computer network in simplified form, and that a computer network can have other suitable configurations. The example configuration of computer network 100 enables clients 102 connecting to the computer network via a client-side node can be routed to any server-side node 108 of the network via selection of (e.g., via routing) intermediate nodes and/or communication links. Thus, computer network 100 provides an example in which failure events may be addressed by mitigation actions in a variety of ways to provide continuity in access by clients to resources of the computer network.

Figure 1B:
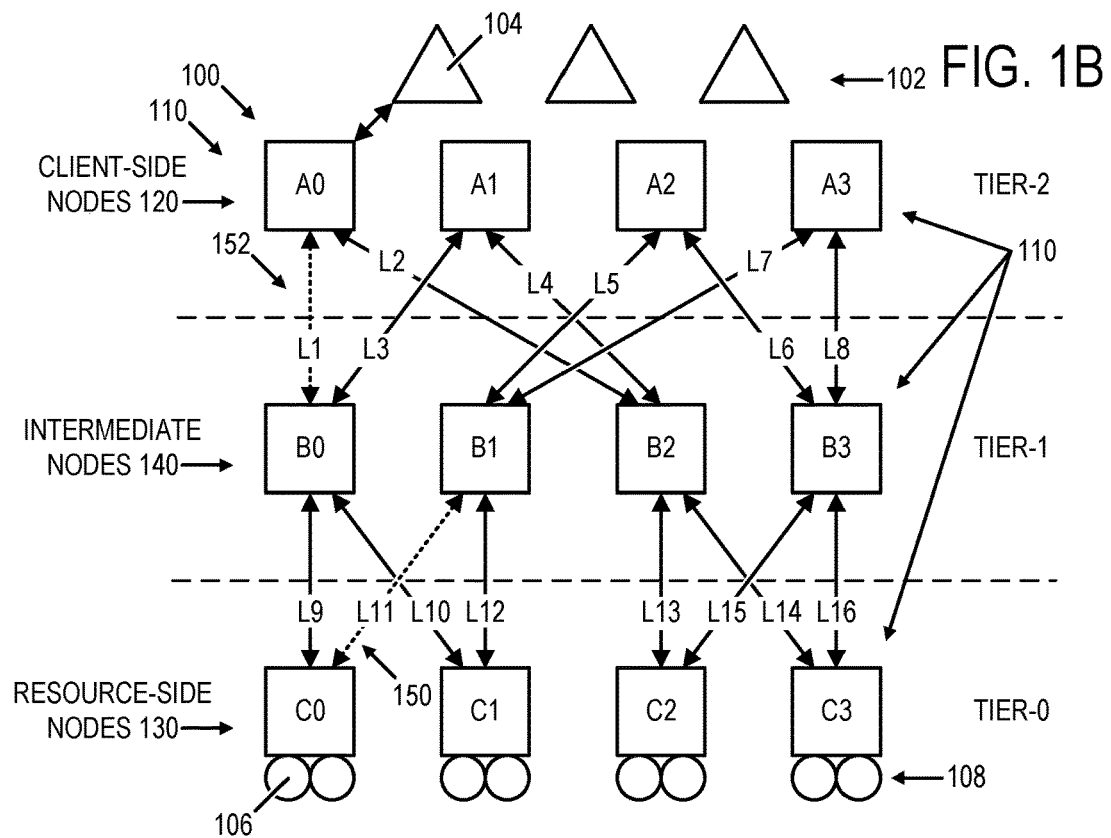
FIG. 1B is a schematic diagram depicting the example computer network of FIG. 1A in which a sequence of example failure events has occurred.

FIG. 1B is a schematic diagram depicting computer network 100 of FIG. 1A in which example a sequence of example failure events 150 and 152 has occurred. Failure event 150, as an example, includes frame check sequence (FCS) errors appearing on communication link L11 between nodes B1 and C0. In this example, before an operator of the computer network can physically replace communication link L11, damage to communication link L1 (e.g., a fiber or other link cut event) results in congestion-induced packet loss as failure event 152. Following failure event 150, but before failure event 152, a network operator may select and implement a mitigation action to address failure 150, for example. Following failure event 152, the network operator may select and implement another mitigation action to address failure 152 and/or failure 150, as another example. Such mitigation actions may include affirmative mitigation actions or other mitigation actions, such as taking no action or rolling back a previous mitigation action implemented at the computer network.

As an example, computer network 100 may have an existing mitigation action to address failure event 150 at the time that failure event 152 occurs. Thus, in response to failure event 152, the network operator faces a potentially complex task of identifying a suitable mitigation action to address failure event 152 without insight as to how previous failure event 150 and/or the existing mitigation action to address failure event 150 will impact service level objectives if another mitigation action is implemented at the computer network. For example, implementation of certain mitigation actions to address failure event 152 may lead to substantial and unnecessary performance degradation in computer network 100, including performance degradation that impacts service level objectives, due at least in part, to interaction with previous failure event 150 and/or any existing mitigation actions.

As an illustrative example, a mitigation action that is appropriate for addressing failure event 152 (had previous failure event 150 not occurred and the existing mitigation had not been implemented in response to failure event 150) may have significant negative impact on one or more service level objectives if that mitigation action is implemented following failure event 152 and/or if the existing mitigation action is permitted to persist at the computer network. The failure mitigation service of the present disclosure offers the potential to address these and other issues associated with mitigating failures within computer networks in a manner that reduces impact to service level objectives.

Figure 2:
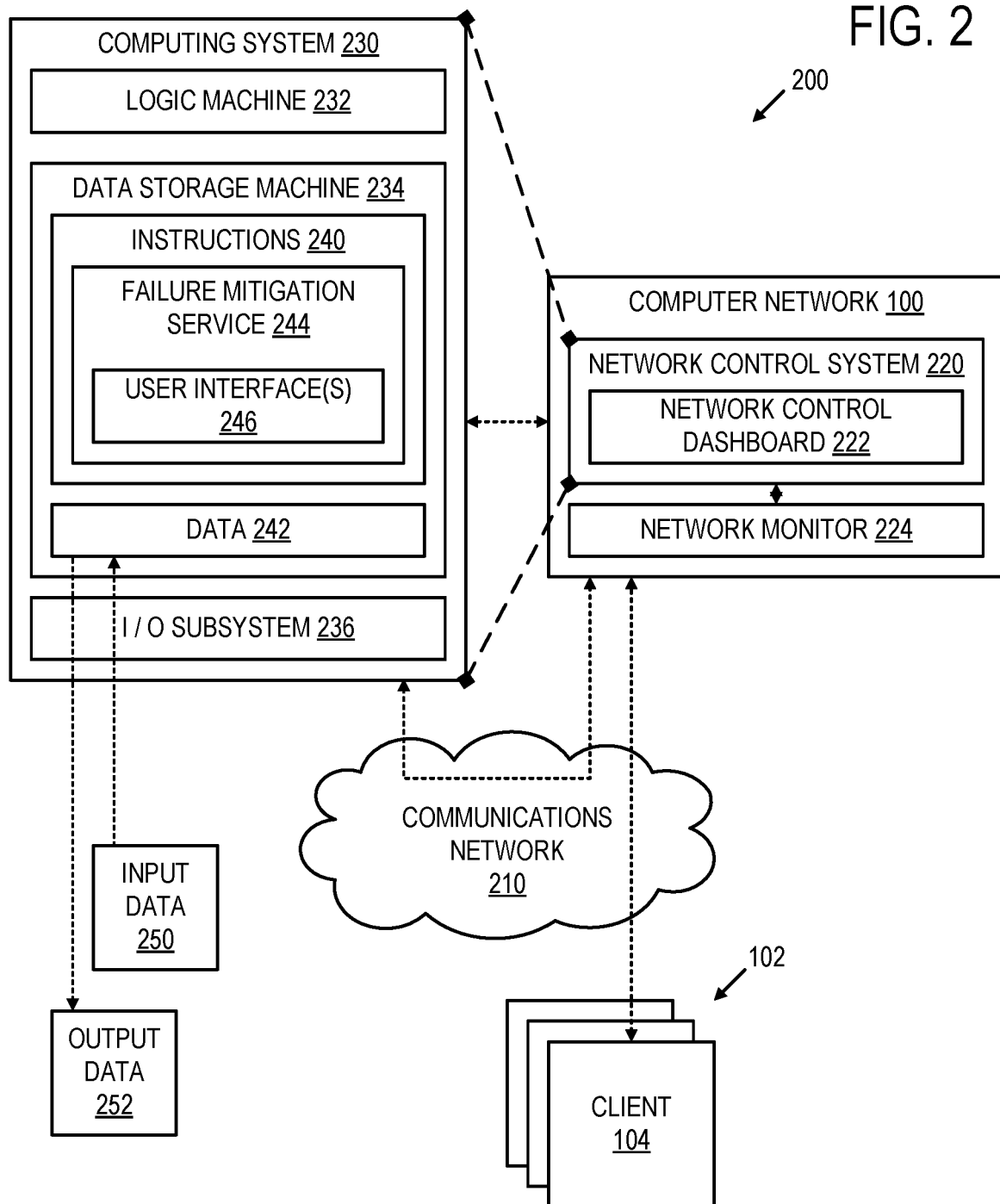
FIG. 2 is a schematic diagram depicting an example computing environment.

FIG. 2 is a schematic diagram depicting an example computing environment 200. Computing environment 200 includes previously described computer network 100 and clients 102 of FIG. 1, and additionally includes an intermediate communications network 210 and a computing system 230.

Within computing environment 200, clients 102 may access computer network 100 and resources thereof via intermediate communications network 210. Communications network 210 may refer to a local-area communications network or a wide-area communications network such as the Internet or a portion thereof, as an example. Within this context, computer network 100 may refer to a collection of network components (e.g., nodes, links, resource servers, etc.) that is managed by a network operator with the capability of providing clients with access to resources hosted by the computer network.

Computer network 100 in this example includes a network control system 220 by which computer network 100 may be controlled. Network control system 220 may include one or more computing devices that are configured to implement control operations at network components of computer network 100, including routing control, load balancing control, implementing mitigation actions, and discontinuing implementation (e.g., rolling back) of mitigation actions within the network. Control of computer network 100 by network control system 220 may include programmatically performed control operations and/or control operations initiated by operators of the computer network (e.g., via a network control dashboard 222). Network control dashboard 222 of network control system 220 may include one or more user interfaces by which operators of the computer network can monitor and control the computer network.

Computer network 100 further includes a network monitor 224 that measures or otherwise observes operation of network components of the computer network, including measurements of network traffic and performance of network nodes, communication links, resource servers, etc.

Network monitor 224 may include a plurality of monitoring components, each associated with respective nodes, links, resource servers, etc. As an example, one or more monitoring components of network monitor 224 may be associated each node, link, resource server, etc. of computer network 100. Measurements of performance of each network component may include data rate, throughput, FTC, jitter, quantity of data flows, quantity of clients, available capacity, and failure status (e.g., via failure status indicators), as examples.

Network control system 220, in combination with network monitor 224, is operable to detect and measure operating conditions of computer network 100, including failure events within computer network 100. For each failure event, network monitor 224 or network control system 220 in combination with network monitor 224 may be configured to generate an indication of the failure event, based on measurements of performance captured by network monitor 224.

In at least some examples, an indication of a failure event may take the form of a failure vector. As an example, each failure vector may identify: (1) a network location of the failure event (e.g., by a particular node identifier, link identifier, resource server identifier, etc.), (2) a failure type of the failure event (e.g., via a failure code), and (3) a magnitude of the failure event (e.g., one or more values that provide a measurement of a severity of the failure event). Failure vector data representing a failure vector may be output by network control system 220 via network control dashboard 222 for review by operators of computer network 100. Additionally or alternatively, failure vector data representing a failure vector may be provided to remotely located computing devices or systems over communications network 210, such as computing system 230.

Computing system 230 includes one or more computing devices. In at least some examples, computing system 230 may form a separate computing platform from computer network 100. As an example, computing system 230 may be remotely located from network control system 220, network monitor 224, and/or other components of computer network 100. In remotely located configurations, computing system 230 may communicate with computer network 100 or components thereof via communications network 210. As another example, computing system 230 may form part of computer network 100 and/or network control system 220. For example, network control system 220 or portions thereof may be implemented by computing system 230.

Computing system 230, in this example, includes a logic machine 232 of one or more logic devices, a data storage machine 234 of one or more data storage devices, and an input/output subsystem 236. Computing system 230 may take various forms, including one or more server devices, a standalone computing device, a mobile computing device, etc.

Data storage machine 234 includes instructions 240 and other data 242 stored thereon. Instructions 240 are executable by logic machine 232 to perform the methods and operations described herein with respect to the computing system. Instructions 240 may include a failure mitigation service 244 comprising one or more computer programs. Failure mitigation service 240 may include one or more user interfaces 246 that enable network operators or third-party personnel to interact with the failure mitigation service.

Within FIG. 2, computing system 230 obtains various forms of input data 250, processes input data 250 via failure mitigation service 244, and outputs various forms of output data 252 based, at least in part, on input data 250 processed by the failure mitigation service. As an example, input data 250 may include measurements of network performance and failure vectors output by network monitor 224 and/or network control system 220. Input data 250 may additionally or alternatively be obtained via user interfaces 246 (e.g., as user input) or other suitable sources.

Output data 252 may include a set of candidate mitigation actions that may be performed on computer network 100 to address a failure vector and an estimated impact by each of the mitigation actions on one or more service level objectives for computer network 100. As an example, estimated impact may be evaluated with respect to a distribution of each service level objective. In at least some examples, output data 252 may identify one or more target mitigation actions that have the lowest estimated impact or a suitable estimated impact (e.g., based on predefined criteria or threshold) on the one or more service level objectives. Output data 252 may be presented or otherwise output via user interfaces 246 in at least some examples. Additionally or alternatively, output data 252 may be provided to network control system 220 by computing system 230 for use by the network control system to programmatically perform one or more operations on computer network 100 (e.g., one or more target mitigation actions) and/or to present output data 252 to network operators via network control dashboard 222.

Figure 3:
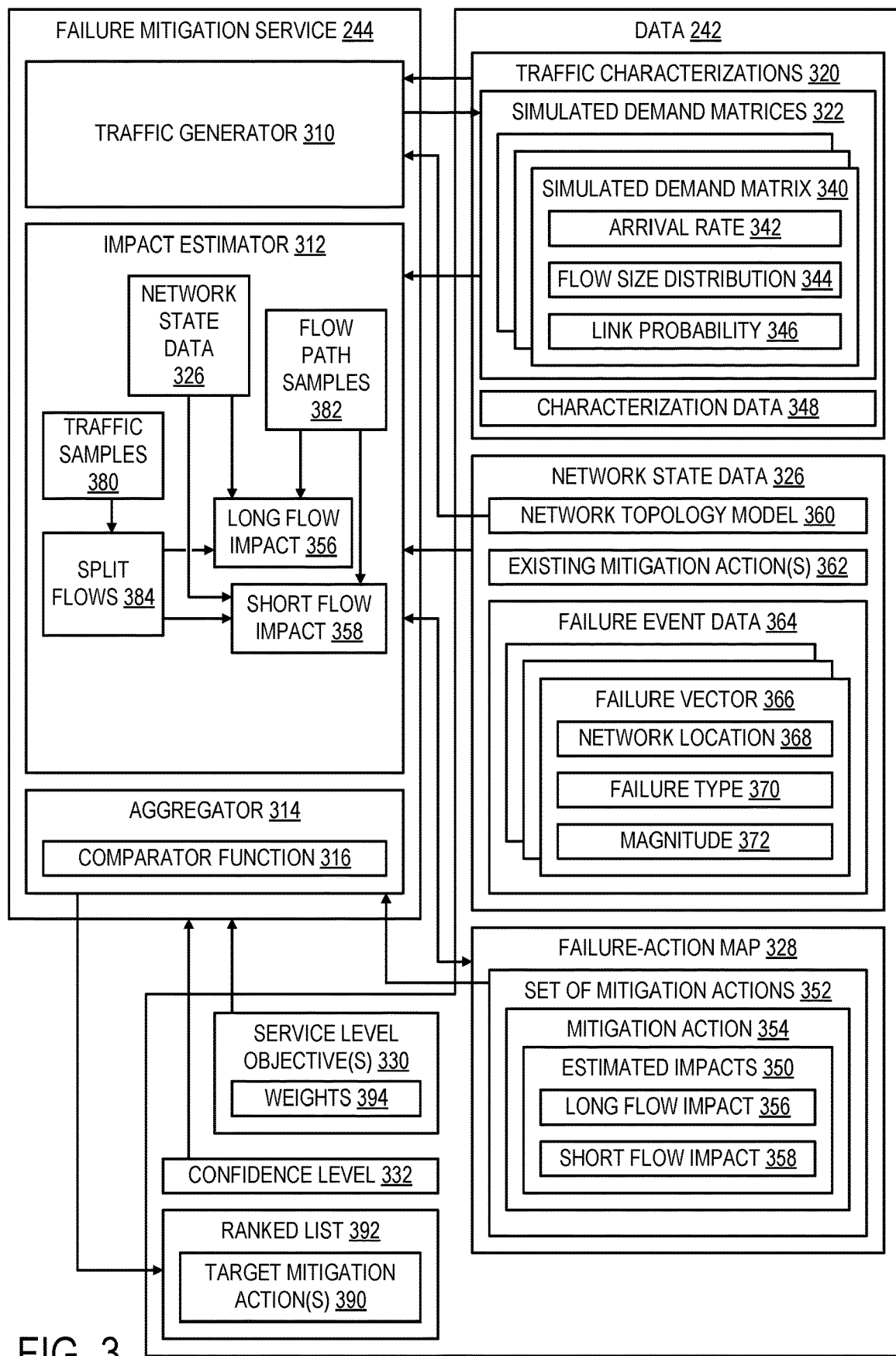
FIG. 3 is a schematic diagram depicting additional aspects of a failure mitigation service and other data of FIG. 2.

FIG. 3 is a schematic diagram depicting additional aspects of failure mitigation service 244 and other data 242 of FIG. 2, including input data 250 and output data 252. In this example, failure mitigation service 244 includes a traffic generator 310, an impact estimator 312, and an aggregator 314 as program components. Collectively, these program components of failure mitigation service 244 are operable to obtain a variety of input data (e.g., input data 250 of FIG. 2) for a computer network (e.g., computer network 100), including indication of a failure event and operator settings, and to generate output data (e.g., output data 252 of FIG. 2), including one or more target mitigation actions suitable to address the failure event.

Data obtained, processed, or output by failure mitigation service 244 may be stored as data 242 of FIG. 2. Examples of data 242 include: traffic characterizations 320, network state data 326, a failure-action map 328, one or more service level objectives 330, and a confidence level 332, among other suitable data (e.g., operator settings). Examples of data output by failure mitigation service 244 for a given failure event occurring within a computer network include one or more target mitigation actions 390 and/or a ranked list of mitigation actions 392.

In this example, traffic generator 310 obtains characterization data 348 for the computer network, and generates a plurality of simulated demand matrices 322 of which simulated demand matrix 324 is an example. Referring to example matrix 340, each simulated demand matrix defines a simulated data flow arrival rate 342 on the computer network of a plurality of simulated data flows having a distribution 344 of simulated flow size and node-to-node link traversal probability 346 within the computer network between the client-side nodes and the resource-side nodes of the computer network.

In at least some examples, traffic generator 310 generates simulated demand matrices 322 based on traffic characterization data 348, which may include a variety of data parameters and associated data values, including performance data measured from the computer network (e.g., via network monitor 224 and/or network control system 220), data input by network operators or third-party personnel via user interfaces 246 and/or network control dashboard 222), and/or data empirically obtained by simulations of the computer network.

Traffic generator 310 may obtain a network topology model 360 of the computer network as input for generating simulated demand matrices 322, in at least some examples. Network topology model 360 refers to a data representation of the computer network that describes the various network components, their performance limitations, and their logical relationship within the computer network. Network topology model 360 may be based on data obtained from network monitor 224 and/or network control system 220, in at least some examples. As another example, network topology model 360 may be input by network operators or third-party personnel via user interfaces 246 and/or network control dashboard 222.

In at least some examples, each simulated demand matrix of the set of simulated demand matrices 322 has different values for one or more of: arrival rate 342, flow size distribution 344, and/or link probability 346, thereby offering a variety of different simulated client demand scenarios for the computer network. As failures within computer networks may take hours or days to resolve by physical replacement or maintenance of network components, mitigation actions applied to the computer network in the interim may persist for a period of time during which traffic on the computer network may be highly variable. For example, traffic on the computer may vary between or among daytime, evening, weekend, typical business hours, special events, etc. The set of simulated demand matrices having different simulated client demand scenarios has the potential to address traffic variability that may occur during the period of time between a failure and physical replacement or maintenance of the network component.

Impact estimator 312, as an example, obtains input data, including simulated demand matrices 322, network state data 326, failure-action map 328, and service level objectives 330, and outputs a set of estimated impacts 350 based, based at least in part, on this input data.

Network state data 326 obtained by impact estimator 312 may include: network topology model 360 of the computer network, existing mitigation actions 362 performed on the computer network, and failure event data 364 identifying failure events within the computer network, as examples. Failure event data 364 may include a failure vector for each failure event occurring within the computer network. Referring to example failure vector 366, each failure vector may identify a network location 368 (e.g., a network component) of the failure event within the computer network, a failure type 370 of the failure event, and a magnitude 372 of the failure event. Failure vectors may include or be associated with a timestamp within failure event data, enabling the computing system to determine a chronological order of the failure events and corresponding failure vectors within the computer network.

For a given failure event, such as a failure event identified by example failure vector 366, failure-action map 328 may be used by impact estimator 312 to identify a set of candidate mitigation actions for addressing the failure event. For example, failure type 370 of failure vector 366 may be used to identify, based on failure-action map 328, the set of candidate mitigation actions 352 from a superset of candidate mitigation actions. Failure-action map 328 may include data representing an association of one or more mitigation actions with each failure type of a plurality of failure types.

FIG. 4 depicts a table of example failure types and associated mitigation actions. The association between failure types and mitigation actions described by the table of FIG. 4 is one example of a failure-action map (e.g., failure-action map 328 of FIG. 3) that may be used by a computing system to identify a set of candidate mitigation actions for a particular failure.

Within FIG. 4, for example, a failure type identified as "packet drop at top of rack" may correspond to data packets being dropped at a top of rack switch of a node of the computer network. The set of candidate mitigation actions associated with this example failure type include: (1) disable the top of rack (e.g., at the switch), (2) move traffic (e.g., change service placement), (3) do not apply any affirmative mitigation action (i.e., the mitigation action includes taking no affirmative mitigation action in response to the failure).

As another example, a failure type identified as "packet drop above top of rack" may correspond to data packets being drop along a communication link coupled to a top of rack switch of a node of the computer network. The set of candidate mitigation actions associated with this example failure type include: (1) take down the switch or link, (2) bring back less faulty links to add capacity (e.g., rollback or discontinue a previous mitigation action on the computer network that disabled or reduced routing over one or more communication links), (3) change Weighted Cost Multipathing (WCMP) weights, (4) do not apply any affirmative mitigation action.

Referring again to FIG. 3, for each mitigation action of the set of candidate mitigation actions, impact estimator 312 applies at least the mitigation action, the failure event, and a simulated demand matrix (e.g., 340) of the set of simulated demand matrices 322 to network topology model 360 to generate a set of samples, which may include traffic samples 380 and/or flow path samples 382, as examples. Impact estimator 312 may additionally apply existing mitigation actions 362 implemented within the computer network and previous failure events persisting within the computer network as identified by failure event data 364 to the network topology model generate the set of samples. A set of estimated impacts 350 for the one or more service level objectives 330 may be generated by impact estimator 312 based on the set of samples, including traffic samples 380 and/or flow path samples 382.

In at least some examples, impact estimator 312 splits traffic samples 380 into long-duration data flows and short-duration data flows at 384. As an example, a duration threshold may be applied by impact estimator 312 to distinguish short-duration data flows and long-duration data flows from each other. In this example, impact estimator 312 generates an estimated impact to a distribution of a service level objective as long flow impact 356 based on the long-duration data flows of traffic samples 380 and flow path samples 382. Impact estimator 312 also generates an estimated impact to a distribution of a service level objective as short flow impact 358 based on the short-duration data flows of traffic samples 380 and flow path samples 382.

Long flow impact 356, as an example, may refer to an estimated impact to a distribution of throughput for long-duration data flows by mitigation action 354 being performed on the computer network. As another example, short flow impact 358 may additionally or alternatively refer to an estimated impact to a distribution of a flow completion time for short-duration data flows by mitigation action 354 being performed on the computer network.

As discussed above, mitigation actions may persist for several hours or days within a computer network. Traffic variability during this period of time may be accounted for by use of multiple demand matrices. To address traffic variability over long durations of time in which a mitigation action may persist within a computer network, impact estimator 312 may be invoked multiple times with multiple demand matrices representing a range of traffic on the computer network. For each mitigation action being evaluated, impact estimator 312 may generate a distribution of throughput and a distribution of FCT across multiple demand matrices.

Impact estimator 312 may be invoked to perform a respective simulation run for each simulated demand matrix of the set of simulated demand matrices 322 by applying the simulated demand matrix to network state data 326 to generate long flow impact 356 and short flow impact 358. In at least some examples, parallel instances of impact estimator 312 may be executed to process multiple simulation runs for multiple simulated demand matrices in parallel.

Each simulation run of impact estimator 312 may be performed to generate a set of traffic samples 380 and a set of flow path samples 382 for a given simulated demand matrix (e.g., matrix 340), failure vector (e.g., 366), existing mitigation actions (e.g., 362), network topology model (e.g., 360), and mitigation action (e.g., 354) being evaluated among the set of candidate mitigation actions 352. The set of estimated impacts 350 may include a long flow impact 356 and a short flow impact 358 for each combination of simulated demand matrix and mitigation action being evaluated. Example algorithms that may be implemented at impact estimator 312 are described in further detail with reference to FIGS. 7, 8, 9, 10A and 10B.

In at least some examples, failure mitigation service 244 may output estimated impacts 350 of each mitigation action over the set of simulated demand matrices 322 in response to a failure event by presenting the set of candidate mitigation actions and associated estimated impacts for review by network operators. Alternatively or additionally, estimated impacts for each mitigation action may be passed to another process, such as aggregator 314 for further processing.

In at least some examples, aggregator 314 obtains estimated impacts 350 generated by impact estimator 312 for each mitigation action of the set of candidate mitigation actions 352, and outputs one or more target mitigation actions 390 based on the estimated impacts. Estimated impact may be aggregated by aggregator 314 among short and/or long-duration impacts to a distribution of each service level objective obtained across a range of simulated demand matrices, and may be represented as an average, minimum, maximum, quantile, range, percentile, or other statistical metric of the service level objectives being evaluated.

One or more target mitigation actions 390 may be included as part of a ranked list 392 of the set of mitigation action 352 in which an order or rank of each mitigation action in the ranked list is based on the estimated impact of that mitigation action on the one or more service level objectives 330 (e.g., to a distribution of each of the one or more service level objectives). For example, the one or more target mitigation actions 390 may correspond to the lowest estimated impact among the set of candidate mitigation actions of ranked list 392. Target mitigation actions 390 and/or ranked list 392 may be output to another process or may be presented to operator users via user interfaces 246 or network control dashboard 222 of FIG. 2, as examples.

In at least some examples, aggregator 314 may implement a comparator function 316 to generate ranked list 392 of mitigation actions and/or to identify one or more target mitigation actions 390. As an example, comparator function 316 may compare an estimated impact of each mitigation action of the set of candidate mitigation actions to determine an order of the mitigation actions from the lowest estimated impact to the greatest estimated impact.

In at least some examples, comparator function 316 may be configured to combine estimated impact for two or more service level objectives to obtain a combined estimated impact that is used to order or rank mitigation actions within ranked list 392. As an example, a combined estimated impact may take the form of a weighted combination of two or more estimated impacts to respective distributions of different service level objectives. The comparator function 316 may apply respective weights 394 associated with service level objectives to the estimated impact to the distribution for that service level objective to generate the combined estimated impact. Weights 394 may be defined by network operators or third-party personnel, as an example. As another example, comparator function 316 may prioritize 1st-percentile throughput over 99th-percentile FCT based on weights 394 associated with service level objectives 330. Components of failure mitigation service 244, in combination, may include aggregator 314 aggregating the estimated impacts from multiple invocations of impact estimator 312 for each of a plurality of candidate mitigation actions, and returning a ranked list of mitigation actions from among the set of candidate mitigation actions being evaluated.

Additionally, confidence level 332 may be provided as an input by network operators or third-party personnel to define a level of confidence in the ranking of mitigations, as provided by aggregator 314. As an example, from each simulated demand matrix's throughput or FCT distribution, aggregator 314 may extract the 1-percentile throughput and 99-percentile FCT. These values may constitute a distribution of the 1st-percentile throughputs or 99th-percentile FCTs across all demand matrices. From each distribution, aggregator 314 may select the 90th-percentile or other suitable value as a robust estimate, then applies the comparator to selected estimate.

In at least some examples, comparator function 316 may be customizable by network operators or third-party personnel. As an example, comparator function 316 may support two types of comparators—a priority comparator and a linear comparator. The priority comparator may be used to consider a set of metrics in a pre-specified priority order. For example, mitigation action A may have a lower impact than mitigation action B if a set of conditions are met. As an illustrative example, a set of conditions may include: (1) 1st-percentile throughput of A is higher than B; or (2) if the 1st-percentile throughputs of A and B are approximately equal, the average throughput of A is higher than B. Another set of conditions may be applied to FCT (e.g., at 99th-percentile FCT). The linear comparator may consider a linear combination of two or more of service level objective metrics, with weights specified by the network operator or third-party personnel. These comparators may enable operators or third-party personnel to exercise their intuition about which aspects of application performance might be important for particular segments of the computer network.

FIG. 5 depicts an example of a ranked list of a set of candidate mitigation actions A-D that may be output by aggregator 314. In this example, each mitigation action has a respective rank within the ranked list. As discussed above, in at least some examples, the rank of each mitigation in the ranked list may be based on a combined estimated impact on two or more service level objectives. As an example, combined value 510 for mitigation action A may represent a lower combined estimated impact than combined value 520 for mitigation action C which in turn may represent a lower combined estimated impact than combined value 530 for mitigation action D which in turn may represent a lower combined estimated impact than combined value 540 for mitigation action B. The combined estimated impact may be based on some or all of the following: long flow impact to a distribution of throughput (e.g., average throughput), short flow impact to a distribution of FCT (e.g., average FCT), short flow impact to a distribution of throughput, and long flow impact to a distribution of FCT, as an example.

Within FIG. 5, weights W-1, W-2, W-3, and W-4 are assigned to respective service level objectives for long-duration and short-duration data flows. In this example, combined value 510 may represent a weighted combination (e.g., a weighted average) of value 512 assigned a weight of W-1, value 514 assigned a weight W-2, value 516 assigned a weight W-3, and value 518 assigned a weight W-4. Similarly, combined value 520 may be based on a weighted combination of values 522, 524, 526, and 528 of respective service level objectives; combined value 530 may be based on a weighted combination of values 532, 534, 536, and 538; and combined value 540 may be based on a weighted combination of values 542, 544, 546, and 548. Weights W-1, W-2, W-3, W-4, etc. are examples of weights 394 that may be defined by network operators or third-party personnel. While mitigation actions are ranked in FIG. 5 based on a combined estimated impact, in other examples, mitigation actions may be ranked based on an individual service level objective or a different combination of two or more service level objectives (e.g., long flow impact for throughput and short flow impact for FCT).

Referring again to FIG. 3, traffic generator 310 may implement an Expectation-Maximization approach. As mitigation actions can be compared on the basis of SLO impact, estimates of throughput distributions and FCT distributions can be approximate as long as their rank reflects SLO impact. As previously described, short-duration and long-duration data flows may be considered separately to account for short-duration flows not reaching steady state.

Traffic generator 310 may use an approximate model of transport protocols (e.g., TCP rate control algorithms) which share a common objective of occupying the data flow's fair share of the bottleneck bandwidth in the absence of failures. For long-duration flows that can reach steady state, traffic generator 310 determines if the long-duration flows are capacity limited or loss limited. For capacity limited flows, traffic generator 310 may compute the fair share of the long-duration flow's bandwidth. For loss limited flows traffic generator 310 may identify the bandwidth that the transport protocol control loop converges to under loss. In reducing transport protocols to these models, traffic generator 310 leverages the insight that perfect SLO estimates are not necessary to accurately order mitigations based on SLO impact.

An iteration loop of impact estimator 312 may be used to address routing uncertainty. As an example, the failure mitigation service generates N different flow path samples, which each represent a different routing of the data flows in the simulated demand matrix. A confidence threshold (a) (e.g., confidence level 332) may be provided as an input to impact estimator 312 (e.g., to the Dvoretzsky-Kiefer-Wolfowitz inequality) to determine the quantity (N) different flow path samples to reach a confidence level of a in the resulting estimates. This approach is described in further detail with reference to algorithm 900 of FIG. 9.

Figure 6:
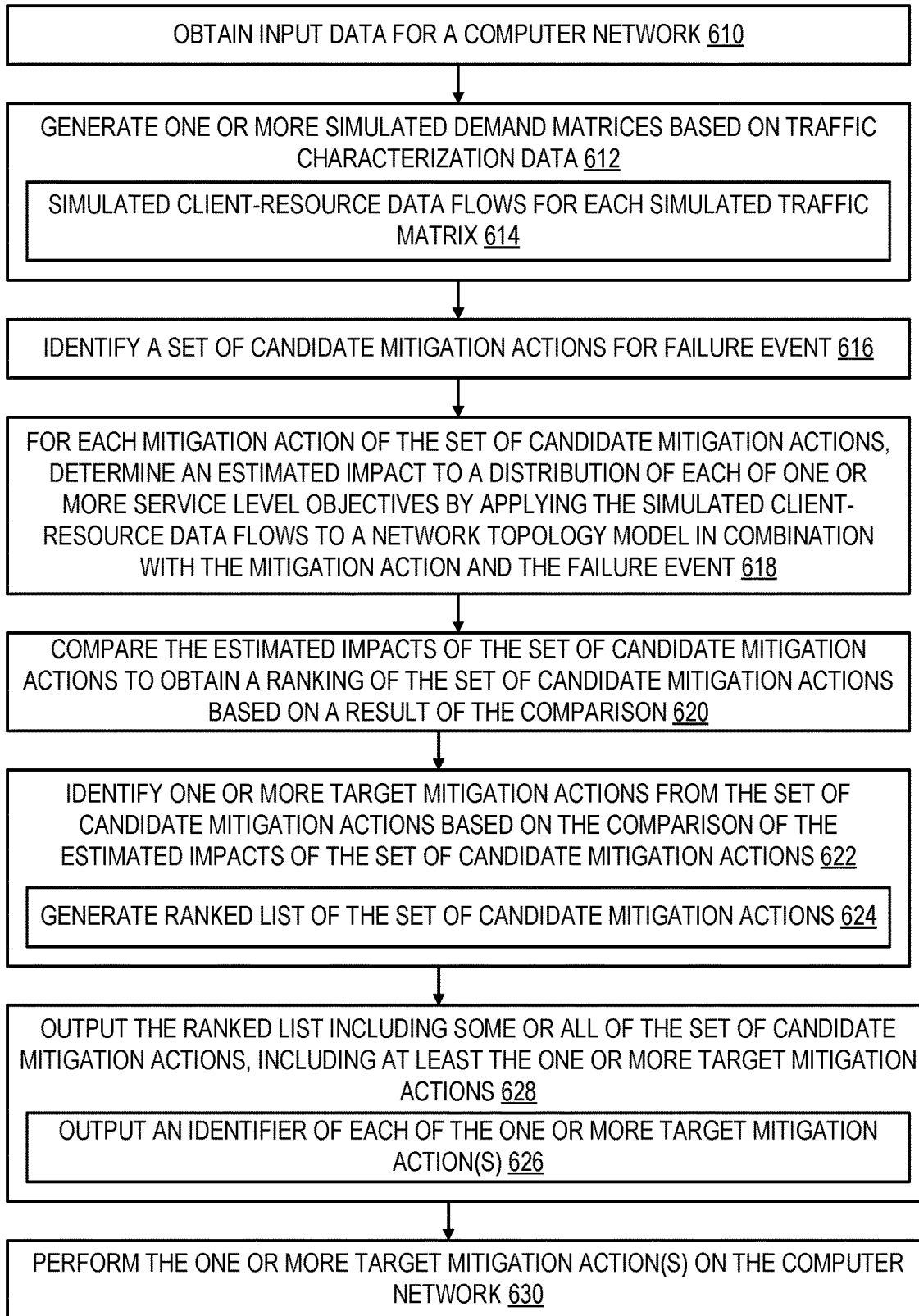
FIG. 6 is a flow diagram depicting an example method.

FIG. 6 is a flow diagram depicting an example method 600. Method 600 may be performed by a computing system of one or more computing devices to identify one or more target mitigations responsive to a failure event of a computer network (e.g., computer network 100 of FIGS. 1 and 2). As an example, computing system 230 of FIG. 2 may perform method 600, such as by executing failure mitigation service 244 and program components 310, 312, and 314 thereof. As previously described, the computer network for which method 600 is performed includes a set of nodes in which each node is linked by a communication link to one or more other nodes of the set of nodes. The set of nodes may include one or more client-side nodes, one or more intermediate tier nodes, and one or more resource-side nodes, as an example.

At 610, the method includes obtaining input data for a computer network for which mitigation actions are to be evaluated for a failure event occurring within the computer network. As previously described with reference to FIGS. 2 and 3, input data may include: traffic characterizations 320, network state data 326, including a network topology model 360 of the computer network, failure event data 364 that identifies a failure event and one or more existing failure events (if present) within the computer network, and one or more existing mitigation actions 362 (if present) performed on the computer network, one or more service level objectives 330 for the computer network (including respective weights 394), one or more simulated demand matrices 322 defining simulated client-resource data flows, a failure-action map 328, a confidence level 332, etc.

At 612, the method includes generating one or more simulated demand matrices based on the traffic characterization data obtained at 610. As an example, operation 612 may be performed by traffic generator 310 of FIG. 3. In examples where a plurality of simulated demand matrices are generated, each simulated demand matrix may define an arrival rate on the computer network of simulated client-resource data flows 614 having a distribution of simulated flow size and node-to-node link traversal probability between the client-side nodes and the resource-side nodes of the computer network.

At 616, the method includes identifying a set of candidate mitigation actions for the failure event indicated by the input data at 610. For example, the failure event may be identified by a failure vector obtained at 610. Operation 616 may be performed by impact estimator 312 of FIG. 3, as an example. In at least some examples, identifying the set of candidate mitigation actions for the failure event may be based on a failure-action map, obtained at 610, that associates a failure type for the failure event of a plurality of failure types with the set of candidate mitigation actions of a superset of candidate mitigation actions. The set of candidate mitigation actions may be identified at 616 responsive to obtaining an indication of the failure event, in at least some examples.

At 618, the method includes, for each mitigation action of the set of candidate mitigation actions, determining an estimated impact to a distribution of each of one or more service level objectives for the mitigation action. As an example, the estimated impact to the distribution of each service level objective may be determined by applying simulated client-resource data flows 614 to a network topology model of the computer network in combination with the mitigation action and the failure event.

In examples where the failure event is identified by a failure vector, the estimated impact to the distribution of each service level objective may be determined for each mitigation action based on the failure vector being applied to the network topology model, including: the network location of the failure event, the failure type of the failure event, and the magnitude of the failure event.

In examples where one or more existing failure events and/or one or more existing mitigation actions persist within the computer network, the estimated impact to the distribution of each of the one or more service level objectives for each mitigation action may be determined by further applying the one or more existing failure events (e.g., the failure vectors of the one or more existing failure events) and/or the one or more existing mitigation actions to the network topology model of the computer network in combination with the mitigation action being evaluated and the failure event being addressed by the mitigation action.

In examples where the simulated client-resource data flows are based on a set of simulated demand matrices, each simulated demand matrix may define a different one or more of: simulated data flow arrival rate of client-resource data flows, simulated flow size, and/or node-to-node link traversal probability than other simulated demand matrices of the set of simulated demand matrices. As previously described, examples of the one or more service level objectives include a throughput, a flow completion time, and jitter of the client-resource data flows.

The simulated client-resource data flows may include a first subset of long-duration data flows and a second subset of short-duration data flows. As an example, throughput may be applied as the service level objective to long-duration data flows of the simulated client-resource data flows, and flow completion time may be applied as the service level objective to short-duration data flows of the simulated client-resource data flows. In at least some examples, the simulated client-resource data flows have a time-varying data transmission rate that is defined by a transmission control protocol (e.g., a congestion control algorithm of TCP), enabling at least some simulated client-resource data flows (e.g., long-duration data flows) to reach steady state within the network topology model.

At 620, the method includes comparing the estimated impacts of the set of candidate mitigation actions to obtain a ranking of the set of candidate mitigation actions based on a result of the comparison. Operation 620 may be performed by aggregator 314 of FIG. 3, as an example. In at least some examples, an estimated impact is determined for each service level objective of a plurality of service level objectives (e.g., throughput for long-duration data flows and FCT for short-duration data flows).

At 622, the method includes, identifying one or more target mitigation actions from the set of candidate mitigation actions based on the comparison of the estimated impacts of the set of candidate mitigation actions. In at least some examples, the one or more target mitigation actions may be identified from among the ranking of the set of candidate mitigation actions obtained at 620 as having the lowest estimated impact on the service level objective(s). As an example, the portion of the ranking identified as the one or more target mitigation actions may be defined as a predefined quantity (e.g., one, two, three, etc. mitigation actions with the least impact) or predefined percentile (e.g., 90th-percentile or greater among mitigation actions with the least impact) of the set of candidate mitigation actions within the ranking that exhibit the lowest estimated impact. In at least some examples, a ranked list of some or all of the candidate mitigation actions may be generated, at 624.

At 626, the method includes outputting an identifier of each of the one or more target mitigation actions. In at least some examples, the identifier of each of the one or more target mitigation actions may be output within the ranked list of some or all of the set of candidate mitigation actions. As an example, the method at 628 may include outputting the ranked list that includes some or all of the set of candidate mitigation actions, including at least the one or more target mitigation actions.

Within the ranked list, each mitigation action may be represented by an identifier of the mitigation action, as described at 626. Identifiers of mitigation actions within the ranked list may be ordered based on the estimated impact of each mitigation action within the ranked list. An identifier of a mitigation action may include a description of the mitigation action or may refer to a description of the mitigation action within a data resource of the computing system or the network control system of the computer network. In at least some examples, the one or more target mitigation actions and/or the ranked list are output responsive to obtaining the failure vector—e.g., from the network monitor and/or network control system of the computer network at 610.

At 630, the method includes performing the one or more target mitigation actions on the computer network. In at least some examples, the computing system may perform or initiate an instruction to the network control system to perform a select one or more of the target mitigation actions in response to a user input received from network operators. As an example, the user input may include selection of a target mitigation action.

In at least some examples, the computing system may programmatically perform or initiate an instruction to the network control system to perform the one or more target mitigation actions on the computer network. Programmatically performed mitigation actions may be selectively rolled back by network operators through interaction with the computing system or the network control system of the computer network.

FIG. 7 depicts an example algorithm 700 that may be implemented by impact estimator 312 for determining an estimated impact for long-duration data flows (e.g., as long flow impact 356) in the form of a distribution of impact. Algorithm 700 receives input data that includes current network state (G) (e.g., network state data 326 of FIG. 3), a simulated demand matrix ($\tau$) (e.g., simulated demand matrix 340 of FIG. 3), a mitigation (M) (e.g., mitigation action 354 of FIG. 3), a measurement interval (I), and an epoch size ($\zeta$); and outputs a distribution of throughput for long flows ($\beta_1$) (e.g., long flow impact 356 of FIG. 3).

Within algorithm 700, time is divided into fixed size epochs, and data flows that would have started in the epoch are start at the beginning of the epoch (line 6). At the end of each epoch, each completed data flow is removed and an overall throughput estimate is recorded. During the epoch, the algorithm may be used to iterate between: (1) fixing the bandwidth available in each link and computing the throughput of each flow as a result and (2) fixing the throughput of each flow and computing the bandwidth available on each link (lines 4-16). This approach may be repeated until the results stabilize (Line 16).

FIG. 8 depicts an example algorithm 800 for determining an estimated impact on long-duration data flows in the form of a distribution of throughput. Within algorithm 800, (G) represents current network state, ($\tau$) represents source destination pairs for long flows, (P) represents sampled paths for each data flow. The output of algorithm 800 is throughput represented by ($\theta$).

Algorithm 800 may be performed by impact estimator 312 each time the impact estimator is invoked for a given simulated demand matrix. Within failure mitigation service 244, flow dependencies may be modeled in a discrete fashion using algorithm 800 depicted in FIG. 8, as an example. Within algorithm 800, time is divided into fixed size epochs, and data flows of the simulated demand matrix that would have started within an epoch based on arrival rate 342 are started at the beginning of the epoch (line 6 of algorithm 800). At the end of each epoch, each completed data flow is removed and an overall throughput estimate is recorded for the completed dataflow.

During each epoch, algorithm 800 iterates between: (1) fixing the bandwidth available in each link and computing the throughput of each flow as a result, and (2) fixing the throughput of each flow and computing the bandwidth available on each link (lines 4-16 of algorithm 800). In each iteration, the flow is determined to be capacity limited or loss-limited. Discretizing time into epochs results in an approximation of throughput. Approximate distributions of throughput can provide a suitable measure of impact on service level objectives where mitigation actions are ranked relative to each other.

When data flows are capacity-limited, throughput of the data flows depends on contending flows. Bottleneck links may be difficult to identify for a given data flow. To address this potential issue, the tiered structure of the network topology may be considered. FIG. 9 depicts an example algorithm 900 for determining throughput of all data flows going through a single communication link (see e.g., line 9). Algorithm 900 depicted in FIG. 9 may be used by impact estimator 312 to compute the bandwidth share of the data flow in each tier of the computer network (Tier-0 to Tier-1 and Tier-1 to Tier-2 in FIG. 1A). Within algorithm 900, (G) represents current network state, (τ) represents a simulated traffic matrix, (M) represents the mitigation action being evaluated, and (α) represents the confidence level (e.g., 332 of FIG. 3). The outputs from algorithm 900 include the distribution of impact ($B_l$) for long-duration data flows and ($B_s$) for short-duration data flows.

FIGS. 10A and 10B depict an example algorithm 1000 for capacity limited throughput. Within algorithm 1000, (G) represents current network state, (τ) represents source destination pairs for long-duration data flows, (P) represents the sampled paths for each data flow, (θ) represents input arrival rate for the data flows, (e) represents the link being evaluated. The output of algorithm 1000 includes the throughput after congestion is applied.

Within each tier of the computer network, for each communication link, a water-filling algorithm such as algorithm 1000 of FIGS. 10A and 10B may be used to identify a data flow's bandwidth share of total bandwidth. This approach approximates transport behavior, but also captures the following property: if a data flow is bottlenecked at a lower tier, the data flow may not use or otherwise occupy the entirety of its bandwidth share at an upper tier, which can be distributed to other data flows.

The bandwidth share of loss-limited data flows may be determined by the packet-loss rate on lossy links traversed by these data flows. While it may be possible to model loss-limited throughput analytically; these models are typically tied to a specific congestion control protocol and may not be easily extensible to all transport variants (e.g., Homa or DCTCP). The approach disclosed herein may instead use an empirically-driven distribution. As an example, different drop rates and different link capacities may be emulated in a testbed, and the throughput achieved by each data flow may be measured. Because the loss-limited throughput is independent of other data flow, this approach has the potential to provide suitable estimates while capturing transport variant behavior. The different drop rates and link capacities that are emulated in this example may be adjusted to account for known transport protocols or uncertainty as to the particular transport protocol used within a computer network.

As described above, short-duration data flows do not typically reach steady state. Therefore, short-duration data flows may be modeled differently than long-duration data flows. In contrast to long-duration data flows, short-duration data flows are less likely to be affected by packet drops within a computer network, at least because fewer data packets are transmitted within the context of short-duration data flows. Additionally, the FCT of short-duration data flows primarily depends on the initial congestion window, the slow start threshold, the packet drop rate of the computer network, and the round trip time (RTT) along the flow path, which can be independent of other data flows within the computer network.

In at least some examples, a table may be pre-computed that maps network characteristics (e.g., packet drop rate and RTT) and flow size to the distribution of FCT. Because this relationship is independent of other traffic, this table may be computed using a relatively small testbed with link capacities that match those of the computer network of interest. Packet drops and RTT variations may be emulated within the test bed.

To measure the FCT of short flows under queuing delay, RTT of the data flow and the number of RTTs needed to deliver the flow's demand may be measured. FCT distributions approximate the number of RTTs required to satisfy demands—e.g., the number of RTTs is affected by the flow size, packet drop rates, congestion control parameters, and path characteristics. Thus, a data flow's RTT may be computed, which comprises the propagation delay (which may be set to a constant e.g., ~50 µs) over the path and the queuing delay the flow experiences in the network. To measure queuing delay, distributions may be computed by gathering data resulting from sending small flows on links with different utilizations and active flow counts. The distribution of FCT for these flows can be computed by applying the function (FCT=(propagation delay+queueing delay)*(number of RTTs)) to the measured distributions, as an example.

As previously described, the methods and processes described herein may be tied to a computing system of one or more computing devices. In particular, such methods and processes may be implemented as a computer-application program or service, an application-programming interface (API), a library, and/or other computer-program product.

FIG. 2 schematically shows a non-limiting embodiment of computing system 230 that can enact one or more of the methods and processes described herein. Computing system 230 is shown in simplified form. Computing system 230 may take the form of one or more personal computers, server computers, tablet computers, network computing devices, mobile computing devices, mobile communication devices (e.g., smart phone), and/or other computing devices.

Logic machine 232 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 234 includes one or more physical devices configured to hold instructions (e.g., 240) executable by the logic machine to implement the methods and processes described herein. When such methods and processes are implemented, the state of storage machine 234 may be transformed—e.g., to hold different data.

Storage machine 234 may include removable and/or built-in devices. Storage machine 234 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 234 may include volatile, nonvolatile, dynamic, static, read/write, read-only, random-access, sequential-access, location-addressable, file-addressable, and/or content-addressable devices.

It will be appreciated that storage machine 234 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 232 and storage machine 234 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 230 implemented to perform a particular function. In some cases, a module, program, or engine may be instantiated via logic machine 232 executing instructions held by storage machine 234. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

A display subsystem of I/O subsystem 236, network control dashboard 222, or peripheral device coupled thereto may be used to present a visual representation of data held by storage machine 234. This visual representation may take the form of a graphical user interface (GUI). As the herein described methods and processes change the data held by the storage machine, and thus transform the state of the storage machine, the state of the display subsystem may likewise be transformed to visually represent changes in the underlying data. A display subsystem may include one or more display devices utilizing virtually any type of technology. Such display devices may be combined with logic machine 232 and/or storage machine 234 in a shared enclosure, or such display devices may be peripheral display devices.

An input subsystem of I/O subsystem 236, network control dashboard 222, or a peripheral device coupled thereto may comprise or interface with one or more user-input devices such as a keyboard, mouse, touch screen, or controller. In some examples, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

A communication subsystem of I/O subsystem 236 may be configured to communicatively couple computing system 230 with one or more other computing devices. A communication subsystem may include wired and/or wireless communication devices compatible with one or more different communication protocols. As non-limiting examples, the communication subsystem may be configured for communication via a wireless telephone network, or a wired or wireless local- or wide-area network. As an example, the communication subsystem may allow computing system 230 to send and/or receive messages to and/or from other devices via a communications network (e.g., 230), such as the Internet.

According to an example disclosed herein, a method performed by a computing system comprises: for a computer network that includes a set of nodes in which each node is linked by a communication link to one or more other nodes of the set of nodes: obtaining a service level objective for client-resource data flows traversing the computer network between client-side and resource-side nodes of the set of nodes; obtaining indication of a failure event at a network location of the computer network; identifying a set of candidate mitigation actions for the failure event; for each mitigation action of the set of candidate mitigation actions, determining an estimated impact to a distribution of the service level objective for the mitigation action by applying simulated client-resource data flows to a network topology model of the computer network in combination with the mitigation action and the failure event; identifying a target mitigation action from the set of candidate mitigation actions based on a comparison of the estimated impacts of the set of candidate mitigation actions; and outputting an identifier of the target mitigation action. In this example or other examples disclosed herein, the service level objective includes a throughput of the client-resource data flows. In this example or other examples disclosed herein, the service level objective includes a flow completion time of the client-resource data flows. In this example or other examples disclosed herein, obtaining the indication of the failure event includes obtaining a failure vector that identifies: (1) the network location of the failure event, (2) a failure type of the failure event, and (3) a magnitude of the failure event; and the estimated impact to the distribution of the service level objective is determined for each mitigation action based on the failure vector applied to the network topology model. In this example or other examples disclosed herein, the failure vector is obtained from a network monitor and/or a network control system of the computer network; and the target mitigation action is output responsive to obtaining the failure vector from the network monitor and/or network control system of the computer network. In this example or other examples disclosed herein, the simulated client-resource data flows are based on a simulated demand matrix that defines a simulated data flow arrival rate on the computer network of the simulated client-resource data flows having a distribution of simulated flow size and node-to-node link traversal probability between the client-side nodes and the resource-side nodes. In this example or other examples disclosed herein, the simulated client-resource data flows are based on a set of simulated demand matrices that define, for each simulated demand matrix, a simulated data flow arrival rate on the computer network of the simulated client-resource data flows having a distribution of simulated flow size and node-to-node link traversal probability between the client-side nodes and the resource-side nodes; and each simulated demand matrix of the set of simulated demand matrices has a different one or more of: the simulated data flow arrival rate, the simulated flow size, the node-to-node link traversal probability than other simulated demand matrices of the set of simulated demand matrices. In this example or other examples disclosed herein, the simulated client-resource data flows include a first subset of long-duration data flows and a second subset of short-duration data flows; and the simulated client-resource data flows have a time-varying data transmission rate that is defined by a transmission control protocol. In this example or other examples disclosed herein, the service level objective is a first service level objective that includes a throughput of the first subset of long-duration data flows; and the method further comprises: obtaining a second service level objective that includes a flow completion time for the second subset of short duration data flows; for each mitigation action of the set of candidate mitigation actions, determining an estimated impact to the distribution of the second service level objective; and identifying the target mitigation action from the set of candidate mitigation actions based on a comparison of a combination of the estimated impact to the distribution of the first service level objective and the estimated impact to the distribution of the second service level objective of each mitigation action of the set of candidate mitigation actions. In this example or other examples disclosed herein, the estimated impact to the distribution of the service level objective for each mitigation action is determined by further applying one or more existing mitigation actions to the network topology model of the computer network. In this example or other examples disclosed herein, identifying the set of candidate mitigation actions for the failure event is based on a failure-action map that associates a failure type for the failure event of a plurality of failure types with the set of candidate mitigation actions of a superset of candidate mitigation actions. In this example or other examples disclosed herein, outputting the identifier of the target mitigation action includes outputting the identifier within a ranked list of one or more other mitigation actions of the set of candidate mitigation actions; and identifiers of mitigation actions of the ranked list are ordered based on the estimated impact of each mitigation action of the ranked list. In this example or other examples disclosed herein, the target mitigation action has the lowest estimated impact to the distribution of the service level objective among the set of candidate mitigation actions. In this example or other examples disclosed herein, the method further comprises programmatically performing the target mitigation action on the computer network.

According to another example disclosed herein, a computing system, comprises: a data storage machine having instructions stored thereon executable by a logic machine of the computing system to: for a computer network that includes a set of nodes in which each node is linked by a communication link to one or more other nodes of the set of nodes: obtain one or more service level objectives for client-resource data flows traversing the computer network between client-side and resource-side nodes of the set of nodes; obtain indication of a failure event at a network location of the computer network; identify a set of candidate mitigation actions for the failure event; for each mitigation action of the set of candidate mitigation actions, determine an estimated impact to a distribution of each of the one or more service level objectives for the mitigation action by applying simulated client-resource data flows to a network topology model of the computer network in combination with the mitigation action and the failure event; identify a target mitigation action from the set of candidate mitigation actions based on a comparison of the estimated impacts of the set of candidate mitigation actions; and output an identifier of the target mitigation action. In this example or other examples disclosed herein, the one or more service level objectives includes a throughput of long-duration data flows of the client-resource data flows and a flow completion time of short-duration data flows of the client resource data flows. In this example or other examples disclosed herein, the indication of the failure event is obtained as a failure vector that identifies: (1) the network location of the failure event, (2) a failure type of the failure event, and (3) a magnitude of the failure event; the network location of the failure event is at a node or a communication link of the computer network; and the estimated impact to the one or more service level objectives for each mitigation action is determined by applying the failure vector to the network topology model of the computer network. In this example or other examples disclosed herein, the simulated client-resource data flows are based on a simulated demand matrix that defines a simulated data flow arrival rate on the computer network of the simulated client-resource data flows having a distribution of simulated flow size and node-to-node link traversal probability between the client-side nodes and the resource-side nodes; and the plurality of simulated data flows have a time-varying data transmission rate that is defined by a transmission control protocol.

According to another example disclosed herein, a computer network, comprises: a set of nodes in which each node is linked by a communication link to one or more other nodes of the set of nodes; a computing system programmed with instructions executable by the computing system to: obtain a service level objective for client-resource data flows traversing the computer network between client-side and resource-side nodes of the set of nodes; obtain indication of a failure event at a network location of the computer network; identify a set of candidate mitigation actions for the failure event; for each mitigation action of the set of candidate mitigation actions, determine an estimated impact to a distribution of the service level objective for the mitigation action applying simulated client-resource data flows to a network topology model of the computer network in combination with the mitigation action and the failure event; identify a target mitigation action from the set of candidate mitigation actions based on a comparison of the estimated impacts of the set of candidate mitigation actions; and output an identifier of the target mitigation action. In this example or other examples disclosed herein, the service level objective includes a throughput of the client-resource data flows or a flow completion time of the client-resource data flows; and the target mitigation action has the lowest estimated impact to the distribution of the service level objective among the set of candidate mitigation actions.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system, the method comprising:
   for a computer network that includes a set of nodes in which each node is linked by a communication link to one or more other nodes of the set of nodes:
   obtaining a service level objective for client-resource data flows traversing the computer network between client-side and resource-side nodes of the set of nodes;
   obtaining indication of a failure event at a network location of the computer network;
   identifying a mitigation action for the failure event;
   determining an estimated impact to the service level objective for the mitigation action by applying simulated client-resource data flows to a network topology model of the computer network in combination with the mitigation action and the failure event; and
   outputting the estimated impact to the service level objective.

2. The method of claim 1, wherein the mitigation action identified for the failure event is one of a plurality of candidate mitigation actions; and
   wherein the method further comprises identifying the plurality of candidate mitigation actions for the failure event from a set of mitigation actions.

3. The method of claim 2, further comprising:
   determining an estimated impact to the service level objective for each of the plurality of candidate mitigation actions by applying the simulated client-resource data flows to the network topology model of the computer network in combination with that candidate mitigation action and the failure event; and
   outputting the estimated impact to the service level objective for each of the plurality of candidate mitigation actions.

4. The method of claim 2, further comprising:
   determining an estimated impact to the service level objective for each of the plurality of candidate mitigation actions by applying the simulated client-resource data flows to the network topology model of the computer network in combination with that candidate mitigation action and the failure event; and
   identifying a target mitigation action from the plurality of candidate mitigation actions based on a comparison of the estimated impacts of the plurality of candidate mitigation actions, wherein the target mitigation action is the mitigation action identified for the failure event.

5. The method of claim 2, further comprising:
   determining an estimated impact to the service level objective for each of the plurality of candidate mitigation actions by applying the simulated client-resource data flows to the network topology model of the computer network in combination with that candidate mitigation action and the failure event;
   identifying a target mitigation action from the plurality of candidate mitigation actions based on a comparison of the estimated impacts of the plurality of candidate mitigation actions, wherein the target mitigation action is the mitigation action identified for the failure event; and
   outputting an identifier of the target mitigation action.

6. The method of claim 1, wherein the service level objective includes one or more of:
   a throughput of the client-resource data flows,
   a flow completion time of the client-resource data flows.

7. The method of claim 1, wherein obtaining the indication of the failure event includes obtaining a failure vector that identifies: (1) the network location of the failure event, (2) a failure type of the failure event, and (3) a magnitude of the failure event; and
   wherein the estimated impact to the service level objective is determined for the mitigation action based on the failure vector applied to the network topology model.

8. The method of claim 1, wherein the estimated impact to the service level objective includes an estimated impact to a distribution of the service level objective for the mitigation action.

9. The method of claim 1, wherein the simulated client-resource data flows include a first subset of long-duration data flows and a second subset of short-duration data flows; and
   wherein the simulated client-resource data flows have a time-varying data transmission rate that is defined by a transmission control protocol.

10. A computing system, comprising:
    a logic machine; and
    a data storage machine having instructions stored thereon executable by the logic machine to:
    for a computer network that includes a set of nodes in which each node is linked by a communication link to one or more other nodes of the set of nodes:
    obtain a service level objective for client-resource data flows traversing the computer network between client-side and resource-side nodes of the set of nodes;
    obtain indication of a failure event at a network location of the computer network;
    identify a mitigation action for the failure event;
    determine an estimated impact to the service level objective for the mitigation action by applying simulated client-resource data flows to a network topology model of the computer network in combination with the mitigation action and the failure event; and
    output the estimated impact to the service level objective.

11. The computing system of claim 10, wherein the mitigation action identified for the failure event is one of a plurality of candidate mitigation actions; and wherein the instructions are further executable by the logic machine to identify the plurality of candidate mitigation actions for the failure event from a set of mitigation actions.

12. The computing system of claim 11, wherein the instructions are further executable by the logic machine to:
  determine an estimated impact to the service level objective for each of the plurality of candidate mitigation actions by applying the simulated client-resource data flows to the network topology model of the computer network in combination with that candidate mitigation action and the failure event; and
  output the estimated impact to the service level objective for each of the plurality of candidate mitigation actions.

13. The computing system of claim 11, wherein the instructions are further executable by the logic machine to:
  determine an estimated impact to the service level objective for each of the plurality of candidate mitigation actions by applying the simulated client-resource data flows to the network topology model of the computer network in combination with that candidate mitigation action and the failure event; and
  identify a target mitigation action from the plurality of candidate mitigation actions based on a comparison of the estimated impacts of the plurality of candidate mitigation actions, wherein the target mitigation action is the mitigation action identified for the failure event.

14. The computing system of claim 11, wherein the instructions are further executable by the logic machine to:
  determine an estimated impact to the service level objective for each of the plurality of candidate mitigation actions by applying the simulated client-resource data flows to the network topology model of the computer network in combination with that candidate mitigation action and the failure event;
  identify a target mitigation action from the plurality of candidate mitigation actions based on a comparison of the estimated impacts of the plurality of candidate mitigation actions, wherein the target mitigation action is the mitigation action identified for the failure event; and
  output an identifier of the target mitigation action.

15. The computing system of claim 10, wherein the service level objective includes one or more of:
  a throughput of the client-resource data flows,
  a flow completion time of the client-resource data flows.

16. The computing system of claim 10, wherein the indication of the failure event includes a failure vector that identifies: (1) the network location of the failure event, (2) a failure type of the failure event, and (3) a magnitude of the failure event; and
  wherein the estimated impact to the service level objective is determined for the mitigation action based on the failure vector applied to the network topology model.

17. The computing system of claim 10, wherein the estimated impact to the service level objective includes an estimated impact to a distribution of the service level objective for the mitigation action.

18. The computing system of claim 10, wherein the simulated client-resource data flows include a first subset of long-duration data flows and a second subset of short-duration data flows; and
  wherein the simulated client-resource data flows have a time-varying data transmission rate that is defined by a transmission control protocol.

19. A computer network, comprising:
  a set of nodes in which each node is linked by a communication link to one or more other nodes of the set of nodes; and
  a computing system programmed with instructions executable by the computing system to:
    obtain a service level objective for client-resource data flows traversing the computer network between client-side and resource-side nodes of the set of nodes;
    obtain indication of a failure event at a network location of the computer network;
    identify a mitigation action for the failure event;
    determine an estimated impact to the service level objective for the mitigation action by applying simulated client-resource data flows to a network topology model of the computer network in combination with the mitigation action and the failure event; and
    output the estimated impact to the service level objective.

20. The computer network of claim 19, wherein the service level objective includes a throughput of the client-resource data flows or a flow completion time of the client-resource data flows; and
  wherein the estimated impact to the service level objective is the lowest estimated impact to the service level objective among a plurality of candidate mitigation actions identified by the computing system for the failure event.

\* \* \* \* \*